A. A. SHARE.
SPRING LUBRICATING DEVICE.
APPLICATION FILED FEB. 2, 1920.
1,361,914. Patented Dec. 14, 1920.
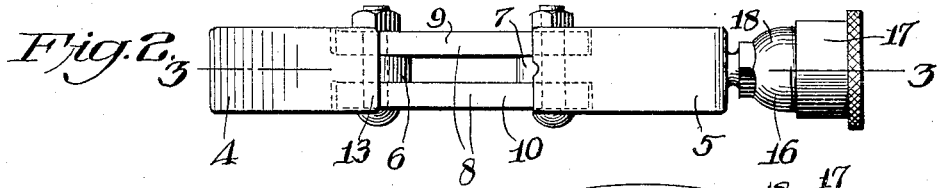
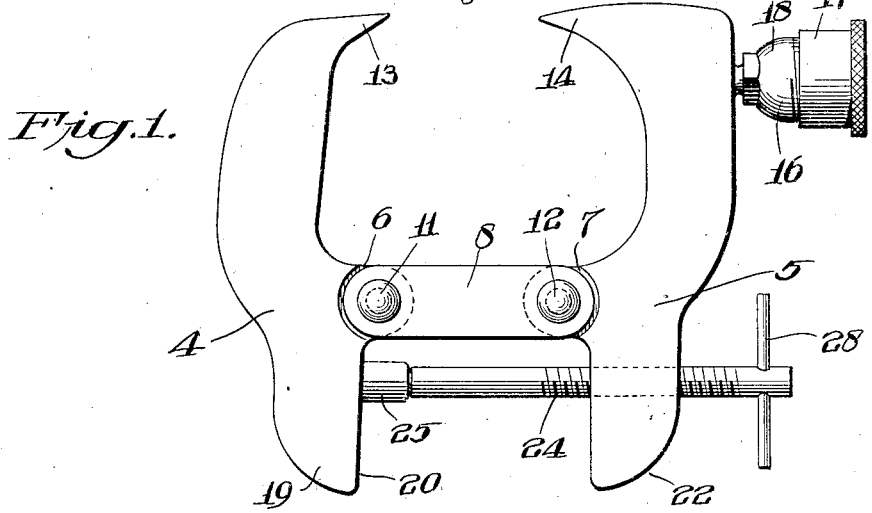
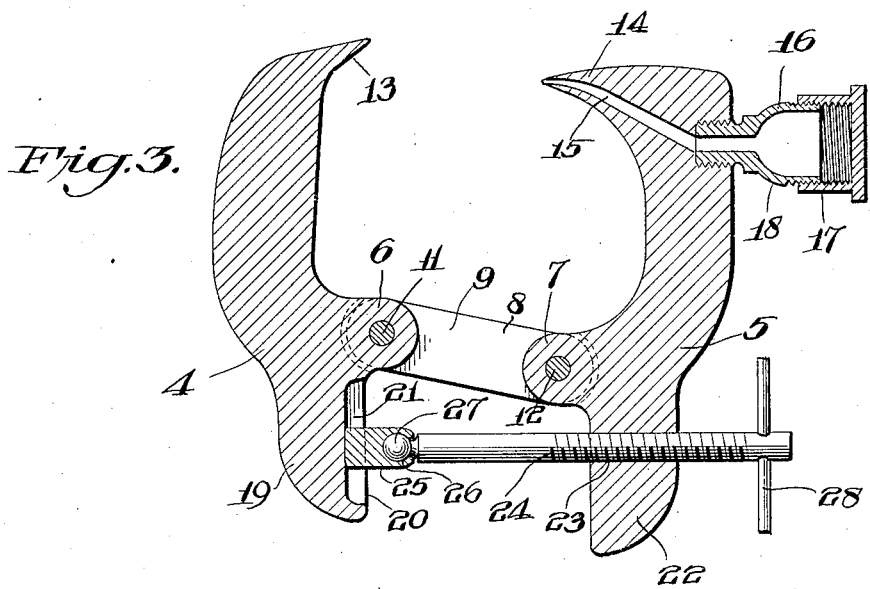
Witnesses:
Inventor
Arthur A. Share,
By Joshua R. H. Toth
his Attorney.

UNITED STATES PATENT OFFICE.

ARTHUR A. SHARE, OF PHILADELPHIA, PENNSYLVANIA.

SPRING-LUBRICATING DEVICE.

1,361,914.    Specification of Letters Patent.    Patented Dec. 14, 1920.

Application filed February 2, 1920. Serial No. 355,721.

*To all whom it may concern:*

Be it known that I, ARTHUR A. SHARE, a citizen of the United States, residing at Philadelphia, in the county of Philadelphia and State of Pennsylvania, have invented certain new and useful Improvements in Spring-Lubricating Devices, of which the following is a specification.

One object of my invention is to provide a device of simple and durable construction which can be quickly and easily used for lubricating between leaves or laminations of springs, such for example as the springs on carriages and automobiles.

Another object is to so construct my improved lubricating device that it can be quickly manipulated to spread and lubricate leaves of springs even though the springs extend at an angle or are otherwise uneven in their "setting."

A still further object is to so construct my improved lubricating device that it can be inserted in comparatively small places where access to the springs is usually difficult.

These objects, and other advantageous ends which will be described hereinafter, I attain in the following manner, reference being had to the accompanying drawings in which—

Figure 1 is a front elevation of my improved lubricating device,

Fig. 2 is a top plan view of Fig. 1, and

Fig. 3 is a section taken on the line 3—3 of Fig. 2.

Referring to the drawings my improved lubricating device includes two arms 4 and 5 which have opposed lugs 6 and 7 respectively. A link 8 is interposed between the arms 4 and 5 and as illustrated is made in two sections 9 and 10. Pivot pins or bolts 11 and 12 extend through the sections of the link 8 and through the respective lugs 6 and 7; said lugs being preferably thinner than the body portion of the arms 4 and 5 so that the link sections will have their outer surfaces substantially flush with the side surfaces of the arms 4 and 5, as clearly shown in Fig. 2. Thus the link 8 pivotally connects the arms 4 and 5 together and each of the arms is capable of swinging on its pivot pin as is obvious from the construction above described and as illustrated.

As shown in the drawings, the arm 4 has a pointed jaw 13 and the arm 5 has a pointed jaw 14 positioned above the points of pivotal connection with the link. A passageway 15 extends through the jaw 14 and a grease cup 16 is screwed in said arm 5 so as to communicate with the passageway 15. The grease cup 16 has a movable section 17 which in the present instance is screwed to the body portion 18 of the cup so that when the cup is filled with grease and the section 17 is turned in one direction, the grease within the cup will be forced through the passageway 15 and out through the pointed end of the jaw 14. The arm 4 below the lug 6 has a projection or finger 19 which at its inner side 20 is provided with a groove 21. The arm 5 also has a projection or finger 22 below its lug 7; said finger 22 having a screw threaded hole 23 through which extends a screw 24.

A shoe 25, which is preferably made of metal is adapted to engage within the groove 21 of the finger 19 and said shoe has a socket 26 into which fits the ball end 27 of the screw 24. A cross bar or handle 28 is secured to the screw 24 outside of the finger 22 so that when the screw 24 is turned by the aid of the handle 28, the arms 4 will be swung on their pivots 11 and 12 in a direction so as to move the jaws 13 and 14 toward or from each other according to the direction in which the screw 24 is turned.

With the above construction it will be noted that by turning the screw 24 in one direction, the pointed jaws 13 and 14 will be moved toward each other and when placed in a straddling position over a spring, said jaws will enter between the leaves of the spring and spread said leaves apart due to the wedging action of said jaws. After the leaves have been spread apart the section 17 of the grease cup 16 can be turned to force grease through the passageway 15 into the space between the separated leaves of the spring.

If for any reason the laminations or leaves of the spring are not parallel or if the spring is distorted, the link connection of the arms 4 and 5 is such as to permit the arms to be moved longitudinally with respect to each other as shown in Fig. 3 so that the pointed jaws will be arranged at different levels. With this construction the device is adjustable to compensate for any irregularities or distortions of the parts and a free movement of the parts of the device is assured.

Also by providing the groove 21 and shoe 25, a sliding connection is produced which renders easy the spreading movement of the leaves of the spring.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including two arms; a link having pivot portions spaced apart and respectively pivoted to said arms, said arms including jaws with opposed points thereon at their outer free ends; and means for pivotally moving said arms whereby said points can penetrate between the leaves of a spring and separate the latter to permit the insertion of lubricant therebetween; substantially as described.

2. A device of the character described including two arms; a link pivotally connecting said arms, said arms having opposed pointed jaws at one side of their pivotal connections with said link and projecting fingers at the opposite side of said pivotal connection; a clamp screw fitting a tapped hole in one of said fingers, the other of said fingers having a groove therein; and a shoe on said clamp screw adapted to engage within said groove; substantially as described.

3. A device of the character described including two arms; a link pivotally connecting said arms whereby the arms can move longitudinally and maintain substantially parallel positions, said arms having opposed pointed jaws at one side of their pivotal connections with said link and projecting fingers at the opposite side of said pivotal connection; and a clamp screw fitting a tapped hole in one of said fingers, said screw having a portion adapted to freely and slidably bear against the other of said fingers so as to permit said longitudinal movement of the arms; substantially as described.

In testimony whereof I have signed my name to this specification in the presence of two subscribing witnesses.

ARTHUR A. SHARE.

Witnesses:
ANNA RENTON,
CHAS. E. POTTS.